United States Patent [19]

Maringer

[11] 4,290,993

[45] Sep. 22, 1981

[54] METHOD AND APPARATUS FOR MAKING NODULE FILAMENT FIBERS

[75] Inventor: Robert E. Maringer, Worthington, Ohio

[73] Assignee: Battelle Development Corp., Columbus, Ohio

[21] Appl. No.: 110,891

[22] Filed: Jan. 10, 1980

[51] Int. Cl.³ ............................................... B29C 5/04
[52] U.S. Cl. .................................. 264/164; 164/130; 264/8; 264/311; 425/8
[58] Field of Search .................. 164/923, 87; 264/8, 264/164; 425/8

[56] References Cited

U.S. PATENT DOCUMENTS

| | | | |
|---|---|---|---|
| 2,522,526 | 9/1950 | Manning | 264/164 |
| 3,311,687 | 3/1967 | Scragg et al. | 264/167 |
| 3,838,185 | 9/1974 | Maringer et al. | 264/8 |
| 3,896,203 | 7/1975 | Maringer et al. | 264/8 |
| 3,900,667 | 8/1975 | Moens | 428/292 |
| 3,904,344 | 9/1975 | Maringer et al. | 425/8 |
| 4,124,664 | 11/1978 | Maringer et al. | 264/164 |
| 4,154,284 | 5/1979 | Maringer et al. | 425/8 |
| 4,215,084 | 7/1980 | Maringer | 264/8 |
| 4,242,069 | 12/1980 | Maringer | 425/8 |

OTHER PUBLICATIONS

New Trend in Material Processing by Pond et al., (Papers presented at a Seminar of Am. Soc. of Metals), Oct. 19 & 20, 1974, pp. 128–164.

*Primary Examiner*—Jay H. Woo
*Attorney, Agent, or Firm*—Robert B. Watkins

[57] ABSTRACT

A method for producing "dogbone" filament fibers having nodules at each end comprising rotating a heat extracting disk having an edge tapering to a narrow peripheral surface and having the peripheral surface notched at intervals with each notch comprising a leading edge, connected to a trailing flat surface, the trailing flat surface supporting an expanded land on the peripheral edge; introducing the rotating disk into the surface of a pool of molten material to form a film of the material on the edge; and removing heat from the film and at least partially solidifying the film on the edge. By the method, the segmented filament fiber products which are produced have a nodule formed on the leading end, a nodule formed on the trailing end, and continuous fiber inbetween, with the general appearance of a dogbone.

12 Claims, 8 Drawing Figures

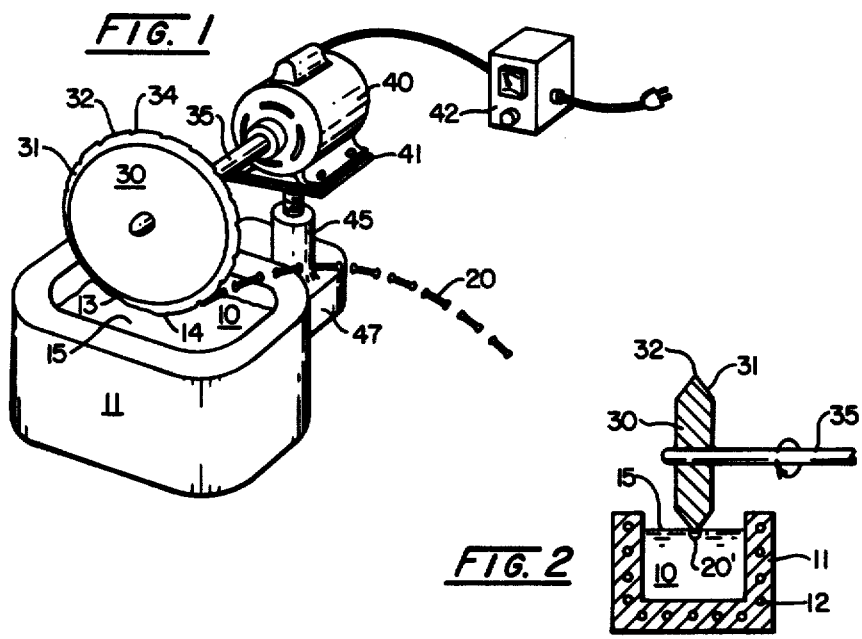
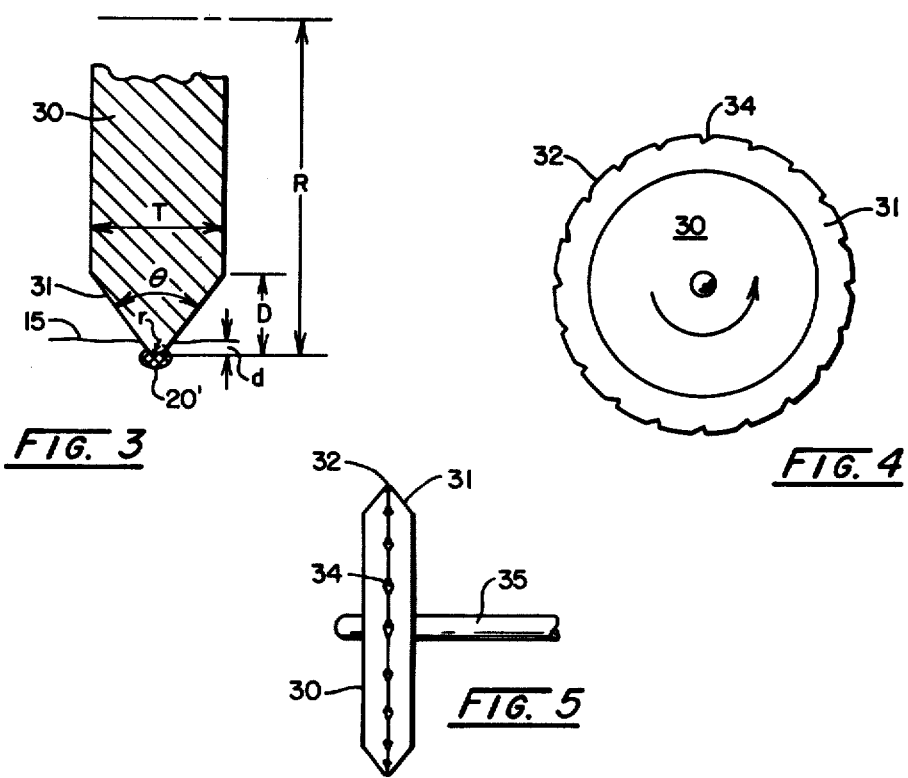

METHOD AND APPARATUS FOR MAKING NODULE FILAMENT FIBERS

SUMMARY OF THE INVENTION

The invention as herein disclosed is a method and apparatus for producing filament fibers having nodules at each end directly from a pool-like supply of molten material. This invention is an improvement of previously disclosed processes and apparatus, wherein discontinuous filament fibers are produced on the peripheral edge of a rotating disk member on which indentations are provided in the peripheral edge. The function of the indentations is to disturb the formation of the filament on the disk edge sufficiently to produce a discontinuous product of a length equal to the distance along the disk edge between successive indentations. A process and apparatus for making discontinuous filament fibers are shown in U.S. Pat. Nos. 3,838,185 and 3,904,344, respectively, in each of which the inventor of this invention also appears as an inventor. Both of the above recited patents are assigned to the assignee of this invention.

The process of this invention and the apparatus of this invention produce improved fibers which have nodules at each end. Each filament fiber has a longitudinally extended generally elongated body portion with a small mass of rounded or irregularily shaped material at each end. In the process of this invention the nodules are formed by contacting the molten pool of material with a specially provided expanded portion or "land" at each end of the edge which is brought into contact with the molten material. In the process molten material is contacted first by a wider portion of the edge, then by the narrower portion of the edge, and finally is contacted by a wider portion of the edge before the edge exits from the pool of molten material.

In the prior art process the pool of molten material is contacted by an edge which continuously remains the same width.

The apparatus of this invention includes an improvement in the structure and formation or shape of the heat extracting rotational member. The improvement is in shape or form of the edge segment between each indentation. Each edge segment is shaped, formed and/or constructed with a beginning flat-like "land" portion and an ending flat-like "land" portion on which the nodules of the product are formed in the process.

The product produced by this invention is a filament fiber having nodules, i.e., an enlarged portion at each end in the general configuration of a "dog bone" or having a "dog bone" appearance. Nodule fibers of this configuration have a very important advantage in their use as reinforcements in matrix materials.

In this application the term "filament fiber" is intended to mean a filament which has a deliberately formed beginning, a deliberately formed end, and a length equal to or less than that obtainable by casting on one circumference length of the heat extracting rotational member. The term "continuous filament" applies to those filaments that are cast substantially continuously as shown in U.S. Pat. No. 3,838,185, and as the term is discussed in the publication "NEW TRENDS IN MATERIALS PROCESSING"—Papers Presented at a Seminar of the American Society of Metals, Oct. 19 and 20, 1974, published by the American Society for Metals, Metals Park, Ohio, 44073. Continuous casting is shown in FIG. 3, Page 132 of that publication. Filament fibers, on the other hand, are usually of relatively short length in contrast to the continuous filaments. Filament fibers and their use are discussed in some detail in the referred to publication where the use of such fibers is particularly pointed out on or about Pages 147-152.

The use of filament fibers as a reinforcement in matrix materials is a very important use. The matrix materials may be plastics or concrete by way of example. When used in these matrices, the fibers are intended to provide reinforcement to the material by carrying various tensile loads through the material and thereby increasing the overall tensile strength of the composite matrix. Prior to this invention of nodule fibers, as well as the method and apparatus for making them, fibers used in matrices were filaments of substantially uniform cross sectional configuration from one end to the other. These prior art filaments depended for their load carrying tensile enhancement in the matrix, upon the adherance between the outside surface of the fiber and the material in contact with the fiber when the fiber was embedded in the matrix. The improved nodule fibers of this invention, however, are more firmly anchored in the matrix by the nodules at each end. Matrices of concrete using nodule fibers have shown an increase in tensile strength over matrices employing prior art fibers of uniform cross section throughout their length. U.S. Pat. No. 3,900,667 discloses the advantages of formed or enlarged ends on fibers used in a concrete matrix.

Earlier conventional methods of producing wire products of small cross sections such as wire, involve the casting of billets and their subsequent formation in the final product by mechanical working that has included extrusion, drawing, rolling, and/or other normal mechanical forming techniques. In addition to these numerous post casting mechanical operations there was the necessity of intermittent heat treatments before the intermediate product could be further mechanically worked. The cost of these subsequent operations left a long standing search for a means to form small cross sectional discontinuous products directly from the molten metal.

The prior art methods used to make such products as filament or wire from inorganic compounds are substantially different since inorganic compounds do not have the mechanical properties to withstand forming processes as used on metallic materials. The formation of compounds in the final shapes is usually carried out while the material is in a molten state such as casting directly into a forming mold. The subject invention forms the desired product directly from the molten state, and therefore inorganic compounds having properties in the molten states similar to that of molten metal and metal alloys may be formed in substantially the same manner. The properties that must be similar to that of molten metal are the viscosity and surface tension in the molten state as well as the compound having a substantially discrete melting point, rather than a broad continuous range of viscosities, characteristic of molten silicate glasses.

Materials conforming to the class having such properties will have a viscosity in the molten state when at a temperature less than 125% of their melting point in the degrees Kelvin, in the range of $10^{-3}$ to 1 poise, as well as having surface tension values in that same temperature range in the order of from 10 to 2,500 dynes/cm.

More recently filaments and fibers of these materials have been made by the melt extraction process.

Broadly stated, the melt extraction process provides for producing a solid discontinuous filament from molten material normally solid at ambient temperature having properties in the molten state at their conventional casting temperatures substantially similar to molten metals, by introducing the indented outer edge of a rotating disk shaped member to the surface of a pool of molten material, removing heat at the circumference of the extremity of such member to cause solidification of the material in filament form on the member between the indentations, and allowing the final filament product to spontaneously release from the member.

For purposes of the melt extraction process of this invention, a pool or pool-like source of molten material is one that is not confined by a limiting orifice and has a free surface relatively free of turbulence. Turbulence does not prevent operation but makes the quality of the product somewhat irregular. As the melt extraction process is practiced, flow induced by the induction heating of the melt does not detrimentally affect operation. In fact, the productivity of the process may be enhanced by flowing molten material parallel to the direction of rotation of the rotating member and increasing the speed of rotation of the member. Generally, flow directed across the member will disturb the filament formation if the magnitude of the flow is sufficiently large.

When the periphery of the rotating disc is introduced to the surface of the melt, a portion of the melt solidifies on the member and is carried through the melt by the rotation. This rotation also initiates a build-up of molten material above the equilibrium level of the melt, immediately adjacent to the point where the member exits the melt. Molten material from the build-up is at a slightly lower temperature than the melt and adheres to the previously formed material on the edge of the rotating member and exits the melt through this build-up.

The form of the final product is partially determined by the portion of the material initially solidified on the member as well as the liquid portion deposited on the solidified portion as it passes through the build-up of material upon exiting the pool of molten material and the distance between indentations on the edge.

In the improvement of this invention, the form of the final product is also determined by the form of the edge of the rotating member. The edge between each indentation is formed with a flat like "land" portion at each end on which the nodule features of the product are formed.

The pool of molten material may be in a heated crucible having an unconfined upper surface in conventional fashion. On the other hand, the pool of molten material may be the molten end of a rod of material. When the end of a rod is heated to the melting point a pendant drop forms which is supported by the surface tension of the material on one side and the base of the rod on the other side. The melt extraction process may be operated by contacting the molten drop with a heat extracting disc in a fashion similar to contacting the unrestrained surface of a molten pool in a crucible. The "pendant drop" variation of the heat extraction process is described in some detail in U.S. Pat. No. 4,154,284 issued to the inventor of this application and assigned to the same assignee. The pendant drop variation of melt extraction is also shown in U.S. Pat. No. 3,896,203.

BRIEF DESCRIPTION OF THE DRAWINGS

FIG. 1 is an isometric view of the apparatus and method for practicing this invention to produce the product.

FIG. 2 is a vertical cross section of the apparatus of FIG. 1 showing the shape of the disk-like member used to produce the filament fibers of this invention.

FIG. 3 shows an enlarged cross section of the tip of a disk-like member in a melt illustrating the physical dimensions that affect the properties of filamentary products.

FIG. 4 shows a side view of a disk-like member that produces filaments having a controlled length.

FIG. 5 shows the disk-like member of FIG. 4 turned 90°.

DETAILED DESCRIPTION OF THE INVENTION

Figure 6:
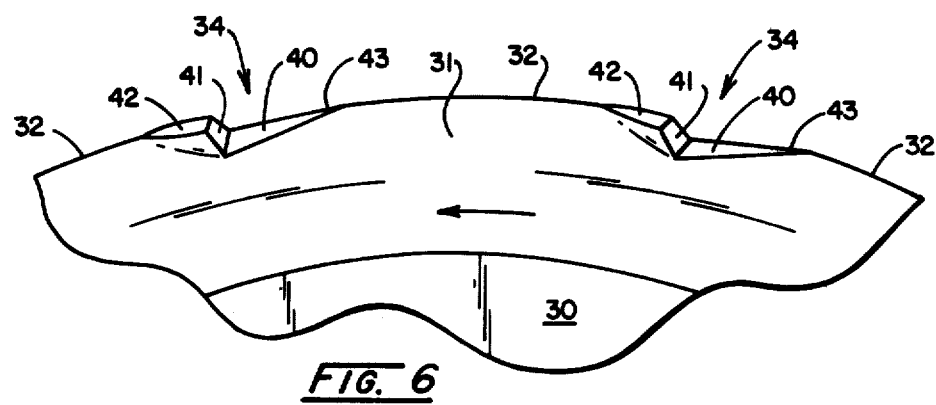
FIG. 6 shows an enlarged isometric view of a portion of the periphery of the disk-like member shown in FIGS. 4 and 5.

The means by which the discontinuous filament fiber products of this invention are produced is illustrated in an embodiment in FIG. 1. For the forming of a product, a disc 30 is rotated by its attachment through some sort of power transmission device such as the shaft 35 to a rotating means herein disclosed as an electric motor 40. The motor 40 is mounted on a platform 41 which is capable of being adjusted vertically through the use of a jack 45. The placement of the jack base 47 is not critical and the process is not adversely affected by minor misalignments or deviations from the true vertical. While minor natural vibrations from the rotation of the apparatus do not seem to adversely affect the formation process, and the process has been successfully employed without using damping materials under the base 47, the quality of the filament is enhanced by the elimination of vibration. The electric motor 40 should have some method of controlling its rotational speed and, as illustrated, the apparatus is equipped with a reostat-type control 42. The support plate 41 may be extended toward the disc 30 to provide a support for a shaft bearing (not shown) if the length of the shaft 35 and the size of the disc 30 pose alignment or vibrational problems. It would also be possible to extend the shaft 35 through the disc 30 to the other side to another support bearing (not shown). For most applications the shaft 35 is substantially parallel to the surface 15 of the melt 10; however, this angle may be acute with no substantial detriment to the formation process. The disc 30 must introduce a relatively narrow surface to the melt 10 to form a filament product 20, but the exact shape of the surface will be discussed with other parameters; however, in general, discontinuous filament fibers will emanate from a disc 30 that rotationally introduces a small area 32 of its circumference having substantially line contact between the indentation 34 with the surface of the melt 10 or to a build-up of molten material above the surface.

When the disk-shaped member introduces only a small chord length of its peripheral edge, its contact with the melt is narrow and elongated in the direction of the filament length and is best described as a line contact. This line contact promotes solidification on a narrow area 32 on the member 30 and the direction of heat removal solidifies a filamentary form that is not simply a female replica of the peripheral edge introduced to the surface of the melt 10. The process will become unstable when the melt 10 raises the temperature of the area 32 to a degree where the solidification rate is significantly retarded and the area 32 is removed from the melt 10 before any significant solidification can form a filament 20' on the area 32 as shown in FIGS. 2 and 3. It has been found that the rotating member can pass through the melt at speeds up to 200 ft/sec and still promote solidification. It has been found that the preferred range of operating speeds is from 3 to 100 ft/sec.

Normally filament is formed in the melt by controling the area of contact of the rotating member as well as its contact time with the molten material so that the typical cross-sectional dimension of the filamentary product is less than 0.060 inch but greater than the width of the cross section of the edge introduced to the molten material as measured parallel to the axis of rotation of the member at the average depth of immersion of the edge of the rotating member. Referring to FIG. 3, the width of 20', and subsequently 20, will be greater than the width of the radiused portion of the member 30 at r.

The supply of molten material referred to as the melt 10 may be composed of an elemental metal, metal alloy, or an inorganic compound heated and contained by a vessel 11 having elements 12 to heat the material contained to a temperature above its melting point. While the amount of superheat (number of degrees in excess of the material's equilibrium melting point) will affect the size or gage of the filament 20, it has been found that substantially constant diameter filaments 20 can be produced with a melt at a temperature less than 125% of the equilibrium melting point (in °K.) of the material used with no need for the precise control of the melt temperature during operations. While this quantitative definition of the preferred temperature will normally encompass the desired melt temperature, it should be understood that the formation process does not require unusual melt temperatures. Therefore, the present invention is known to be operable with metals and metal alloys at conventional casting temperatures that represent a compromise between the cost of heating versus fluidity of the molten material. The melt 10 may have a thin protective flux coating to prevent excessive reaction with the surrounding atmosphere without substantially disturbing the formation of the filament 20. The filament is initially formed, as illustrated in FIG. 3, below a surface of the melt 10 and will pass through most surface fluxes without any adverse effects. Where it is desired or necessary, the simplicity of the apparatus lends itself to the use of a simple container (not shown) for the process where the atmosphere surrounding the melt 10 and the filament 20 while it is still at high temperatures can be kept inert. Product of this invention has been successfully produced from high carbon tool steel. Experience has shown that other metals such as aluminum, cast iron, low carbon steel, stainless steel, titanium, columbium and metal alloys could be used, by way of example.

While these materials are known to be readily formed into filaments by the subject invention, the present invention is obviously applicable to a wider range of molten materials. The present invention may be used with any material having several specific properties similar to those of a molten metal, i.e. having a low viscosity in the range of from $10^{-3}$ to 1 poise, a high surface tension in the range of from 10 to 2,500 dynes/cm, a reasonably discrete melting point, and being at least momentarily compatible with a solid material having sufficient heat capacity of thermal conductivity to initiate solidification on the outer edge 32 of the disk 30 made of that solid material.

For the purposes of this invention, a reasonably discrete melting point shall be defined as one exhibited by materials changing state from liquid to solid, changing state of one alloy component passing through a liquidus line on a temperature-composition phase diagram, or any change in state exhibiting a discontinuous viscosity increase upon reduction of melt temperature.

Experience has shown that metallic glasses, such as nickel-boron-silicon or iron-boron-silicon compositions, should also be formable by the method of this invention, even though these have normally continuous viscosity curves.

Filamentary products have been produced from a molten alkali nitrate heat treating salt known commercially as Houghton's Draw Temp 430 available from E. F. Houghton & Company, Philadelphia, Pa., which is typical of inorganic compounds having the aforementioned properties in the molten state.

The disk 30 as shown in the Figures has a configuration that produces filament fibers 20 from the melt 10. Referring now to FIGS. 1 and 2, the disk 30 is rotated within the melt 10, just below the surface 15, and subsequent to its entry into the melt 10 at 13 the disk nucleates solid material on the edge 32 of the disk 30, not necessarily at point 13, by removing the super heat and the heat of fusion of the melt 10. During the rotation of the disk 30 the melt 10 continues to solidify on the disk edge 32, forming the filament fiber 20'. The size of the filament fiber 20' is determined by the size and shape of the imposed disk surface 32, and the amount of heat removed by the disk 30. The amount of heat removed, therefore, depends on several controlled variables one of which is the residence time of a point of the disk edge 32 within the melt 10, which is a function of the distance along the disk edge 32 from point 13 to 14 and the speed of rotation of the disk 30. The size of the final filament fiber 20 is determined by the amount of molten material 10 that is deposited on 20' when it passes through the build up of molten materials 16.

Another variable affecting heat removal is the shape of the disk edge 32. It must nucleate and grow a filamentary product yet dissipate enough heat to maintain it at a temperature below that of the melt 10. The shape of the disk 30 as illustrated in FIG. 3 shows the physical dimensions that affect the rate of heat removal. The disk 30 is inserted into the melt 10 at a depth shown in the figure as d. Filamentary products are most efficiently produced when the value of d is less than 0.060 inch and yields a filamentary product less than 0.010 in$^2$ in cross-sectional areas.

The variables $\theta$ T & D, as shown in FIG. 3 affect the conductivity of the heat emanating from the edge 32 to the cooler portions of the disk 30. These variables are controlled by the chill material and any form of external cooling of the disk 30. The manipulation of these variables is not critical and one skilled in the art can successfully arrive at a workable configuration without excessive trial and error. The value of R affects the process in two ways, one of which is affecting the mass of the member 30 and hence its thermal capacity. The thermal capacity of the disk 30 can be controlled by material selection, external cooling, and the manipulation of the variables θ, T, and D; therefore, variation of R is not primarily used to control the total thermal capacity of the disk 30. R does, however, directly affect several important variables; namely, the aforementioned residence time of a point on the disk edge 32 within the melt 10 and the generation of centrifugal forces that affect the spontaneous removal of the filament 20 from the disk 30 at point 25.

FIGS. 4 and 5 illustrate a disk 30 having a plurality of indentations 34 along the disk edge 32. The function of these indentations is to disturb the formation of the filament 20' on the disk edge 32 sufficiently to produce a discontinuous product of a length approximately equal to the distance along the disk edge 32 between successive indentations 34. The shape of the indentations 34 that has successfully produced a discontinuous filament is essentially in the form of a slanted V as shown in FIG. 5. The slanted V-shape has proved to limit effectively the length of the filament while not accumulating solidified metal in the indentations 34 that would eventually affect the indented function of the indentations 34. Preferably, indentations 34 should have a depth of about two times the diameter of the fibers on the edge 32.

Since the distance along the disk edge 32 between successive indentations 34 controls the length of the filaments produced, the spacing of these indentations can be controlled to produce short filaments of equal length, a controlled distribution of filament lengths, or a series of longer filaments with a length limited to the circumference of the disk 30 the the use of single indentation 34.

The improvements of this invention are most clearly shown in FIG. 6 wherein the shape of the indentations 34 are shown in further detail. Each indentation 34 comprises a leading surface 40 and a trailing surface 41. Between the indentations 34 and adjacent to the trailing surface 41, each edge 32 is widened into an expanded land area 42.

At the intersection of the edge 32 and leading surface 40, the edge 32 is also formed or shaped with a widened or expanded land portion 43.

Figure 8:
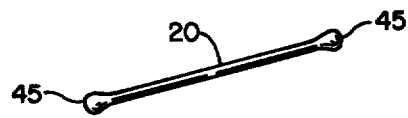
FIG. 8 is a plan view of a filament fiber product of this invention.

In the operation of the process and in the use of the apparatus, filament fibers 20 are formed on a segment of the edge 32. The segment begins with the expanded land 43 and ends with the expanded land 42, respectively. Because of the expanded land surfaces 43 and 42, additional wider nodules of material are formed on the segment at the beginning and at the end of each filament fiber 20. A central portion of substantially uniform narrower cross section extends between the nodules. The improved filament fiber products 20 are shown in FIG. 8 with associated nodules 45 at each end. Filament fiber products 20 have the general appearance of a "dog bone".

The expanded lands 42 at the trailing end of the segment are preferrably shaped in arcuate prolongation of the edge 32, neither "higher" nor "lower" than an arcuate projection of the edge would be if extended to the end of the segment. It has been satisfactory to cross-sectionally form the expanded lands substantially flat and perpendicular to the sides of the disk 30. However, it is believed that slight deviation in the shape should not affect the formation of nodules on the expanded lands, so long as there is an increase in surface area presented for contact with the molten material.

Figure 7:
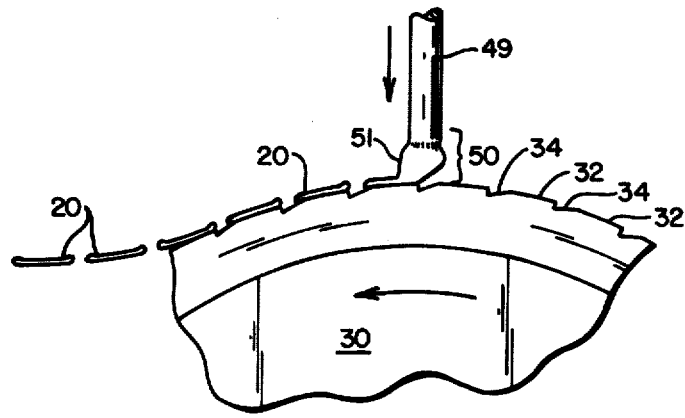
FIG. 7 shows a side view of a rotating heat extracting member forming filament fibers from a pendant drop of molten material on a rod-like source of material.

Referring to FIG. 7, apparatus is shown for the pendant drop melt extraction process of practicing the improvement of this invention. Rod 49 of material to be used in the filament fiber products 20 is shown supported above a rotating heat extracting disk 30. Lower portion 50 of the rod 49 is heated by external means not shown but in a manner as described in U.S. Pat. No. 3,896,203. A molten pendant drop 51 is formed at the bottom of the rod 49 through which the edges 32 pass and on which is extracted solidifying filament fibers 20 which are separated by indentations 34. The indentations having the improvement of this invention are described with particularity in the preceding disclosure and shown in FIG. 6. The product is shown in FIG. 8.

The following specific example in conjunction with the teachings of the above specification and the cited prior art are sufficient to enable one skilled in the art to carry out the present invention as well as to understand what is presently known about it.

EXAMPLE

Nodule filament fibers were produced using the molten pendant drop apparatus in an air atmosphere with an acetylene torch as the heat source for the material, and ¼ inch diameter high carbon tool steel as the material. The gas mixture was kept slightly acetylene rich, to limit the oxidation of the molten droplet. An 8 inch diameter, single-edge, heat extracting, water cooled copper disk was rotated at 300 rpm (10 ft. per second). The tool steel rod was fed to the disk at the rate of 0.2 inches per minute.

Good quality product was produced on this copper disk. The depth of the indentations were about 0.010 inch. Indentations were about 0.08 inches apart on the peripheral edge of the disk. The indentations were produced by impact, which left a raised "upset" section. This raised section was flattened to the configuration shown in FIG. 6 of the drawings. Nodule filament fibers approximately 0.060 inch long and 0.005 inches in diametrical cross section between the nodules were produced.

It is herein understood that although the present invention has been specifically disclosed with the preferred embodiments and examples, modification and variations of the concepts herein disclosed may be resorted to by those skilled in the art. Such modifications and variations are considered to be within the scope of the invention and the appended claims.

What is claimed is:

1. In the method of producing filament fibers by rotating a heat extracting disk having an edge tapering to a narrow peripheral surface and having the peripheral surface indented at intervals, followed by introducing the rotating disk into the surface of a pool of molten material to form a film on the edge segments between indentations, and removing heat from the film while at least partially solidifying the film on the edge segments, the improvement comprising introducing a widened portion of the tapered edge segment at the leading surface of the indentations into the surface of the molten material followed by introducing a narrowed portion of the edge segment into the surface of the molten material, and then introducing a second widened portion of the tapered edge segment into the molten material as the edge is withdrawn from the molten material.

2. A method according to claim 1 wherein the introduction of the widened portion of the tapered edge segment and the withdrawal of the widened portion of the tapered edge segment is produced by the passage of the indentations through the pool of molten material.

3. A method according to claim 1 wherein the pool of molten material is a container of melted material.

4. A method according to claim 1 wherein the pool of molten material is a molten pendant drop formed on the end of a solid portion of the material.

5. A method according to claim 1 wherein the widened portions of the tapered edge segment provide expanded land surfaces on which are formed nodules of the material connected by material inbetween.

6. A method according to claim 5 wherein the expanded land on the leading end of the segment is an extention of the leading surface of the indentation.

7. A method according to claim 5 wherein the second expanded land surface is an arcuate projection of the tapered edge segment.

8. In an apparatus for the production of filament fibers having a substantially uniform cross section in a central portion and enlarged nodules at the ends thereof, from molten material, comprising:
  (a) a means for supporting a pool of said molten material;
  (b) a heat-extracting disk having at least one circumferentially extending peripheral edge upon which said filament fibers at least partially solidify, with said edge predominately tapering to a narrow peripheral surface;
  (c) at least one indentation on said edge forming at least one edge segment between the leading surface and the trailing surface of said indentation, to limit the length of said filament fibers to the length of the edge segment;
  (d) the improvement of each edge segment having a widened leading land portion for the formation of nodules of material, a central portion having a narrow peripheral surface for formation of uniform cross section of material, and a trailing widened land portion for the formation of nodules of material;
  (e) means of rotating the disk about its axis of rotation; and
  (f) means of moving said disk relatively closer and farther from the pool of molten material.

9. Apparatus according to claim 8 wherein the leading land portion is the leading surface of the indentation.

10. Apparatus according to claim 8 wherein the trailing land portion is an arcurate projection of the predominately tapering edge.

11. Apparatus according to claim 8 wherein the trailing land portion is in prolongation of the tapering edge.

12. Apparatus according to claim 10 wherein the cross section of the trailing land portion is substantially flat and perpendicular to the sides of the disk.

* * * * *